us009639770B2

(12) United States Patent
Paradkar et al.

(10) Patent No.: US 9,639,770 B2
(45) Date of Patent: May 2, 2017

(54) SYSTEM AND METHOD FOR IMPROVING COMMUNICATION PRODUCTIVITY

(71) Applicant: Konica Minolta Laboratory U.S.A., Inc., San Mateo, CA (US)

(72) Inventors: Foram Manish Paradkar, San Jose, CA (US); Yongmian Zhang, Union City, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 55 days.

(21) Appl. No.: 14/669,212

(22) Filed: Mar. 26, 2015

(65) Prior Publication Data
US 2016/0283816 A1    Sep. 29, 2016

(51) Int. Cl.
| | | |
|---|---|---|
| G06K 9/00 | (2006.01) | |
| G06K 9/46 | (2006.01) | |
| G06K 9/62 | (2006.01) | |
| H04N 7/15 | (2006.01) | |
| G06F 17/30 | (2006.01) | |

(52) U.S. Cl.
CPC ....... *G06K 9/4604* (2013.01); *G06F 17/3053* (2013.01); *G06F 17/30516* (2013.01); *G06F 17/30598* (2013.01); *G06K 9/00315* (2013.01); *G06K 9/00335* (2013.01); *G06K 9/6202* (2013.01); *G06K 9/6267* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 2009/0319459 | A1* | 12/2009 | Breazeal | G06K 9/00335 706/46 |
| 2012/0274736 | A1* | 11/2012 | Robinson | H04N 7/15 348/14.16 |
| 2014/0198196 | A1* | 7/2014 | Howard | G06K 9/00281 348/78 |
| 2016/0150184 | A1* | 5/2016 | Gandhi | H04N 7/15 348/14.08 |

OTHER PUBLICATIONS

Andrea Stevenson Won et al., Automatically Detected Nonverbal Behavior Predicts Creativity in Collaborating Dyads, J Nonverbal Behav, Published online: May 22, 2014, pp. 1-20.

(Continued)

*Primary Examiner* — Manav Seth
*Assistant Examiner* — David Perlman
(74) *Attorney, Agent, or Firm* — Buchanan Ingersoll & Rooney PC (57) ABSTRACT

A method, computer readable storage medium, and system are disclosed for improving communication productivity, comprising: capturing at least one three-dimensional (3D) stream of data on two or more subjects; extracting a time-series of skeletal data from the at least one 3D stream of data on the two or more subjects; and determining an engagement index between the two or more subjects by comparing the time-series of skeletal data on each of the two or more subjects over a time window.

20 Claims, 7 Drawing Sheets

(56) References Cited

OTHER PUBLICATIONS

Andrea Stevenson Won et al., Automatic Detection of Nonverbal Behavior Predicts Learning in Dyadic Interactions, IEEE Transactions on Affective Computing, pp. 1-14.
Jacob Whitehill et al., The Faces of Engagement: Automatic Recognition of Student Engagement from Facial Expressions, Transactions on Affective Computing, pp. 1-14.
Charles Rich et al., Recognizing Engagement in Human-Robot Interaction, Human-Robot Interaction, Osaka, Japan 2010, pp. 1-8.
Yukiko I. Nakano et al., Estimating User's Engagement from Eye-gaze Behaviors in Human-Agent Conversations, IUI'10, Feb. 7-10, 2010, Hong Kong, China, pp. 1-10.
Roman Bednarik et al., Gaze and Conversational Engagement in Multiparty Video Conversation: An annotation scheme and classification of high and low levels of engagement, GaseIn'12, Oct. 26, 2012, Santa Monica, California, USA, pp. 1-6.

* cited by examiner

Features Summed For Head and Torso

1. Angle of head, shoulder center and spine nodes
2. Angle of shoulder center, spine and hip center nodes
3. Angle of right and left shoulder nodes and spine and shoulder center nodes.
4. Angle of right and left shoulder nodes, and head and shoulder center nodes
5. Angle of right and left hip nodes, and right and left shoulder nodes
6. Angle of right and left hips and spine and hip center

Features Summed For Right Leg

13. Angle of right and left hips and right knee
14. Angle of spine, right hip and right knee
15. Angle of right hip, right knee and right ankle

Features Summed For Right Arm

7. Angle of right and left shoulders and right elbow
8. Angle of spine, right shoulder and right elbow
9. Angle of right shoulder, right elbow and right wrist

Features Summed For Left Arm

10. Angle of left and right shoulders and left elbow
11. Angle of spine, left shoulder and left elbow
12. Angle of left shoulder, left elbow and left wrist

Features Summed For Left Leg

16. Angle of right and left hips and left knee
17. Angle of spine, left hip and left knee
18. Angle of left hip, left knee and left ankle

SYSTEM AND METHOD FOR IMPROVING COMMUNICATION PRODUCTIVITY

FIELD OF THE INVENTION

The present disclosure relates to a system and method for improving communication productivity, and more particularly to a system and method of monitoring a speaker and one or more listeners to generate an engagement index between the speaker and the one or more listeners and providing feedback to the speaker and/or the one more listeners.

BACKGROUND OF THE INVENTION

The nonverbal behavior of a speaker and one or more listeners can give clues about how engaging the communication is between the participants. For example, being able to detect gestures, postures, nodding and/or shaking of head in agreement or disagreement, or the subconscious changes in the body language can be a very helpful input to a system, which, in turn, can give appropriate feedback to the speaker or listener(s) for improving the communication productivity.

There are very few systems to measure the quantitative index of conversation engagement between one or more listeners and the speaker in real-time. In addition, there is a lack of systems, which provides feedback to the speaker and/or listeners in real-time to improve the communication productivity based on engagement index.

SUMMARY OF THE INVENTION

In accordance with an exemplary embodiment, a method is disclosed for improving communication productivity, comprising: capturing at least one three-dimensional (3D) stream of data on two or more subjects; extracting a time-series of skeletal data from the at least one 3D stream of data on the two or more subjects; and determining an engagement index between the two or more subjects by comparing the time-series of skeletal data on each of the two or more subjects over a time window.

In accordance with an exemplary embodiment, a non-transitory computer readable medium is disclosed containing a computer program storing computer readable code for improving communication productivity, the program being executable by a computer to cause the computer to perform a process comprising: capturing at least one three-dimensional (3D) stream of data on two or more subjects; extracting a time-series of skeletal data from the at least one 3D stream of data on the two or more subjects; and determining an engagement index between the two or more subjects by comparing the time-series of skeletal data on each of the two or more subjects over a time window.

In accordance with an exemplary embodiment, a system is disclosed for improving communication productivity, comprising: a data input module for capturing at least one three-dimensional (3D) stream of data on a subject; a module for extracting a time-series of skeletal data from the at least one 3D stream of data; and a processor configured to: determine an engagement index between the two or more subjects by comparing the time-series of skeletal data on each of the two or more subjects over a time window.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method are disclosed, which can provide an intelligent system for measuring a conversation engagement index between a speaker and one or more listeners and can provide appropriate feedback, for example, in real-time. In addition, the system and method can quantitatively measure the synchrony between the speaker and the one or more listeners to indicate how engaging the conversion is between the participants, and providing appropriate feedback in real-time, for example, if a change should be made in the approach and/or substance of the conversation to make the conversation more engaging.

Figure 1:
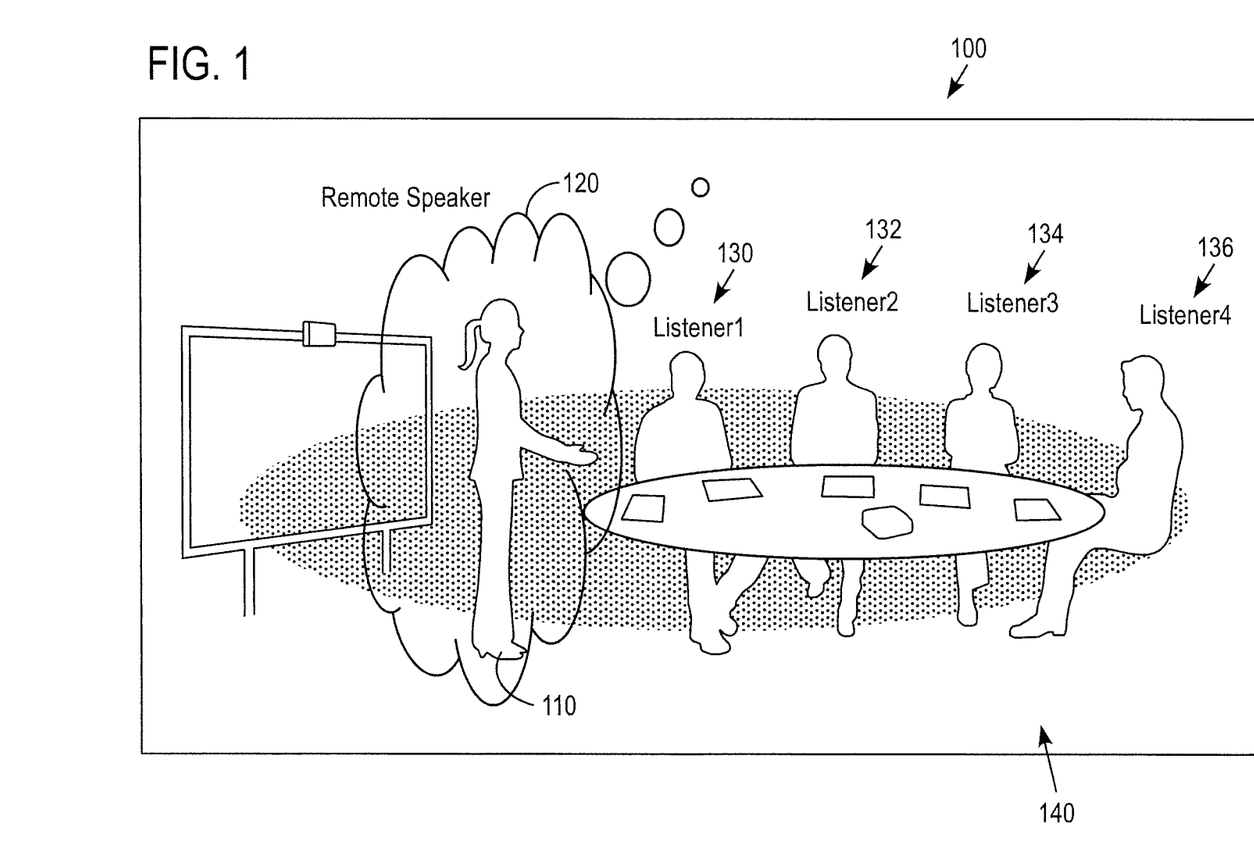
FIG. 1 is an exemplary scenario of a remote conference call in accordance with an exemplary embodiment.

FIG. 1 is an exemplary scenario of a remote conference call 100 in accordance with an exemplary embodiment with a fixed (or remote) speaker 110 at a first location (location 1) 120 and one or more listeners 130 at a second location (location 2) 140. The use of the term "fixed" (or remote) speaker can be used to describe a single speaker giving a presentation or talk, rather than an interactive discussion between two or more participants. As shown in FIG. 1, the speaker 110 can be fixed, for a majority part of the presentation, for example, a conference call, and thus the conference call 100 can be configured such that the speaker 110 can be used as a reference to measure synchrony between the fixed speaker 110 and the one or more listeners 130.

In accordance with an exemplary embodiment, the remote conference calls can also include speakers (for example, variable speakers) 110, 130 at both the first location (location 1) and the second location (location 2) 140. In the scenario with variable speakers 110, 130 at both the first and second locations 120, 140, the identity of the speakers 110, 130 can change from the first location 120 to the second location 140 and from second location 140 to the first location 120.

In accordance with an exemplary embodiment, at both locations, a speaker detection module 332 (FIG. 3) can be activated in order to detect the identity of the speaker, and the corresponding information can be passed to an engagement index measurement module as a reference for calculating engagement index scores between the current speaker and the one or more listeners 110, 130.

Figure 2:
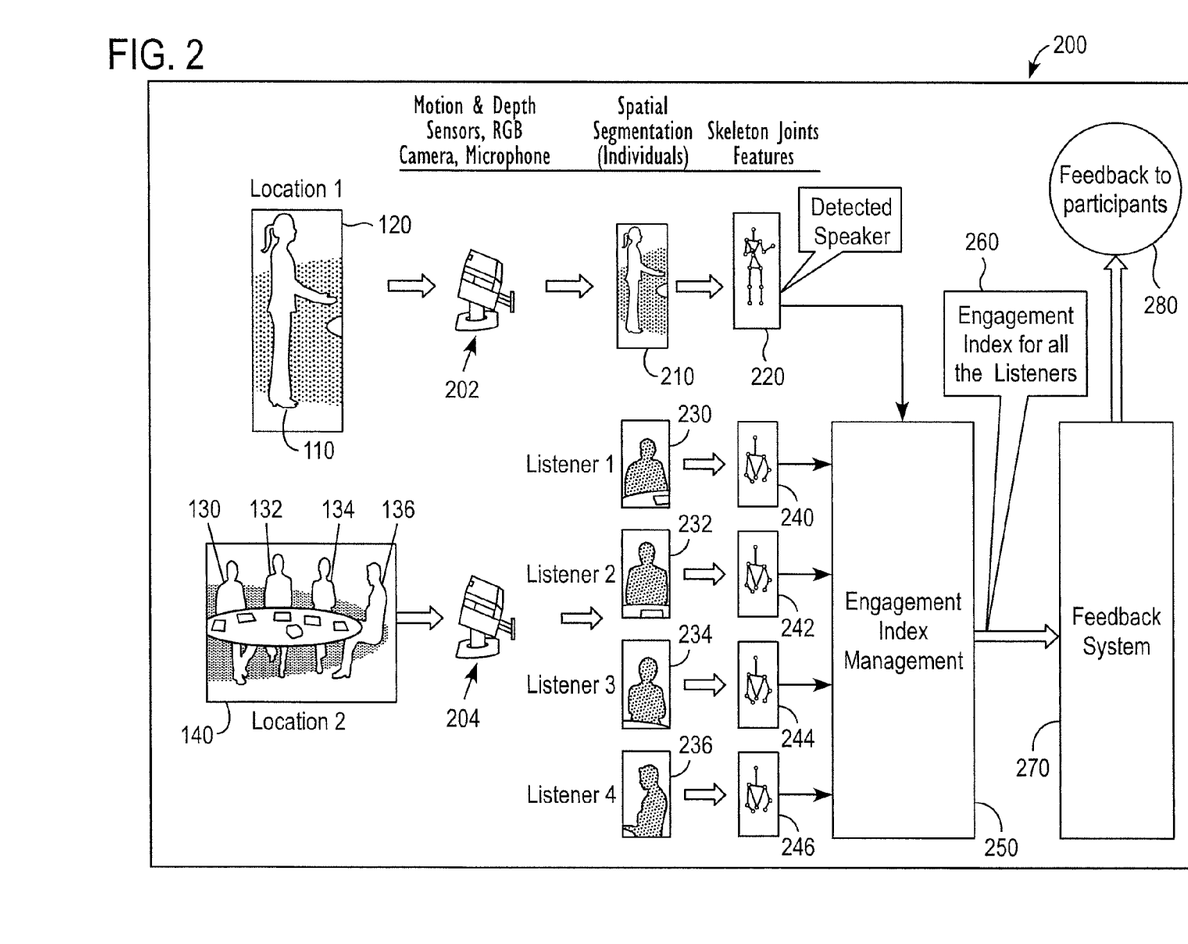
FIG. 2 is a diagram of a communication system having a speaker in accordance with an exemplary embodiment.

FIG. 2 is a diagram of a communication system 200 having at least one speaker 110 at a first location 120, and one or more listeners 130, 132, 134, 136 at one or more second locations 140. As shown in FIG. 2, each of the first and the one or more second locations 120, 140 can include, for example, one or more data input devices 202, 204, which can include a motion and/or depth sensor, a RGB camera, and/or microphones. For each of the speakers and/or listeners, 110, 130, 132, 134, 136, a spatial segmentation 210, 230, 232, 234, 236 is obtained and the skeleton joint features 220, 240, 242, 244, 246 can be generated.

In accordance with an exemplary embodiment, the skeleton joint features 220, 240, 242, 244, 246, can be input into an engagement index measurement module 250, which can generate an engagement index 260 for each of the listeners 110, 130, 132, 134, 136, which can be fed into a feedback module 270. The feedback system module 270 can then provide feedback 280 to one or more of the speakers and/or listeners 110, 130, 132, 134, 136.

In accordance with an exemplary embodiment, with a fixed speaker 110 at a first location 120, (location-1) and one or more listeners 130, 132, 134, 136 at second location 140 (location 2), a data input device 202, 204, for example, in the form of a motion and depth sensors can be installed at both the first and second locations 120, 140 to capture the non-verbal behavior of the speaker 110 as well as the listeners 130, 132, 134, 136. In addition, there can multiple approaches to measure the engagement index of the conversation between the speaker and listener(s) as disclosed herein.

For example, in accordance with an exemplary embodiment, the engagement index 260 can be generated by engagement detection, which can include tracking the body movements of the speaker 110, and/or the one or more listeners 130, 132, 134, 136 involved in the conversation, which can include facial gesture recognition of the speaker 110 and/or one or more listeners, 130, 132, 134, 136, and/or detection of nodding or shaking the head of the one or more listeners 130, 132, 134, 136.

In accordance with an exemplary embodiment, engagement detection can be performed by tracking the body movements of the speaker 110 and/or one or more listeners 130, 132, 134, 136 involved in the conversation. For example, in accordance with an exemplary embodiment, an engagement index 260 between the speaker 110 and the listeners 130, 132, 134, 136 can be measured and/or obtained by measuring the engagement index between a speaker 110 and one or more listeners 130, 132, 134, 136 based on a 3D (three dimensional) analysis of the positions of the body joints of the speaker 110 and/or the one or more listeners 130, 132, 134, 136.

Figure 3:
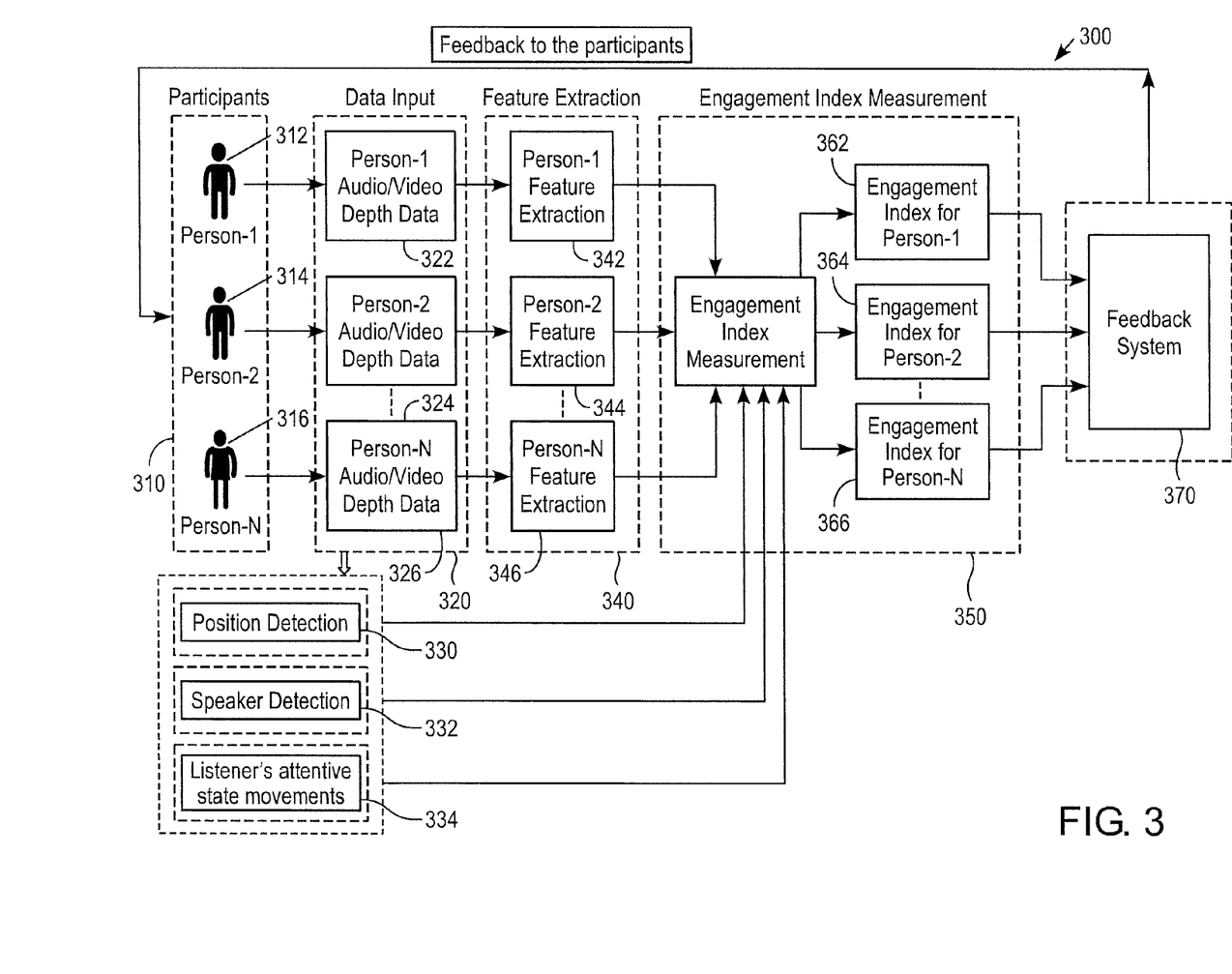
FIG. 3 is a block diagram of a system in accordance with an exemplary embodiment.

FIG. 3 is a block diagram of a system 300 in accordance with an exemplary embodiment. As shown in FIG. 3, the system 300 can include a modular design, which can provide flexibility to select different methods to measure an engagement index between speaker and listener(s) 312, 314, 316 depending on the scenario. In addition, the system 300 can include a feedback system 370 to provide feedback to the participants 312, 314, 316.

As shown in FIG. 3, the system 300 can include a plurality of participants 310 (Person-1, Person-2 . . . Person-n), each of the plurality of participants 312, 314, 316 having a data input module 320, the data input module 320 configured to receive audio, video and/or depth data 322, 324, 326 for each of the plurality of participants 312, 314, 316. The system 300 can also include a position detection module 330 configured to detect if the positions of the speaker and the listeners are similar or different, a speaker detection module 332 configured to detect which of the plurality of participants 312, 314, 316 is speaking, a listener's attentive state movement module 334 configured to record the listener's attentive state movements, a feature extraction module 340, an engagement index measurement module 350 configured to generate an engagement index 362, 364, 366 for each of the plurality of participants 312, 314, 316, and a feedback system or module 370.

In accordance with an exemplary embodiment, the data input module 320 can be configured to receive data 322, 324, 326, in the form of audio, video and/or depth data for each of the plurality of participants 312, 314, 316. The data 322, 324, 326 can be generated using one or more motion and/or depth sensors, in combination with, for example, video cameras and/or audio devices. Approaches have been proposed for recognizing human gestures from monocular RGB video sequences. However, in some situations, RGB data can be sensitive to various factors like illumination changes, variations in viewpoint and background clutter.

In accordance with an exemplary embodiment, depth sensors with the real-time skeleton extraction have generated interest in human gesture recognition, which can use a stream of skeleton data from a depth sensor for generating input data 322, 324, 326. For example, in accordance with an exemplary embodiment, the sensors can be installed at both the location-1 and location-2 (as shown in FIG. 2) to capture the non-verbal behavior of the speaker as well as listeners. 3D positions of 16 major joints in the human skeleton system can be detected, for example, using a depth sensor or camera and/or motion sensors.

In accordance with an exemplary embodiment, rather than a separate motion or depth sensor in combination with a video camera, the audio and video depth data 322, 324, 326 can be obtained using 3D (three-dimensional) video camera technology. In accordance with an exemplary embodiment, the data extracted from the audio or video depth data 322, 324, 326 can be saved into a file and/or can be directly input into the position detection module 330, the speaker detection module 332, the listener's attentive state movement module 334, the feature extraction module 340, the engagement index measurement module 350, and the feedback system or module 370. For example, the audio, video, and/or depth data can be obtained using a video camera, for example, a RGB-D camera, and wherein the RGB-D camera produces a time-series of RGB frames and depth frames.

The data input module 320, the position detection module 330, the speaker detection module 332, the listener's attentive state movement module 334, the feature extraction module 340, the engagement index measurement module 350, and the feedback system or module 370 can include one or more computer or processing devices having a memory, a processor, an operating system and/or software and/or an optional graphical user interface (GUI) and/or display. In accordance with an exemplary embodiment, for example, each of the modules 320, 330, 332, 334, 340, 350, 370 can be combined in one computer device, for example, a standalone computer, or can be contained within one or more computer devices, wherein each of the one or more computer devices has a memory, a processor, an operating system and/or software, and a graphical user interface (GUI) or display.

Based on the skeleton data from the depth sensors, the position detection module 330 can detect if the positions of speaker and listener(s) are similar or different. If the speaker 110 and listener(s) have similar position (seating or standing), the speaker's movement features will be passed to the engagement index measurement module 350 as a reference. However, if the speaker and listener(s) have different position, then the listener's attentive state's body movements will be passed to the engagement index measurement module 350 as a reference.

Generally, the listener(s) is/are in an attentive state of mind at the beginning of the conversation. The body movement of the person is different in attentive and non-attentive state. Thus, for each participant 312, 314, 316, the attentive state's movement features will be recorded in the beginning of the conversation. When the speaker and listener(s)' positions' are different (output for position detection) these movement features of listener(s) will be used as a reference for calculating the engagement index 362, 364, 366 of a particular listener.

In the group conference/meeting, there can be two scenarios: a speaker will be fixed for major part of the conference, as illustrated in FIG. 1, and alternatively, the speaker can exchange at both the locations. Because the engagement index is measured by synchrony, which needs a reference to measure it, the speaker detection module 332 can detect who is the speaker at the current moment, which information can be passed onto the engagement index measurement module 350 as a reference for calculating an engagement index (or synchrony scores) between the detected speaker and the listener(s). In addition, for example, only when output from position detection module 330 is "similar position," then only the speaker detection module 332 is required to be activated.

Figure 4:
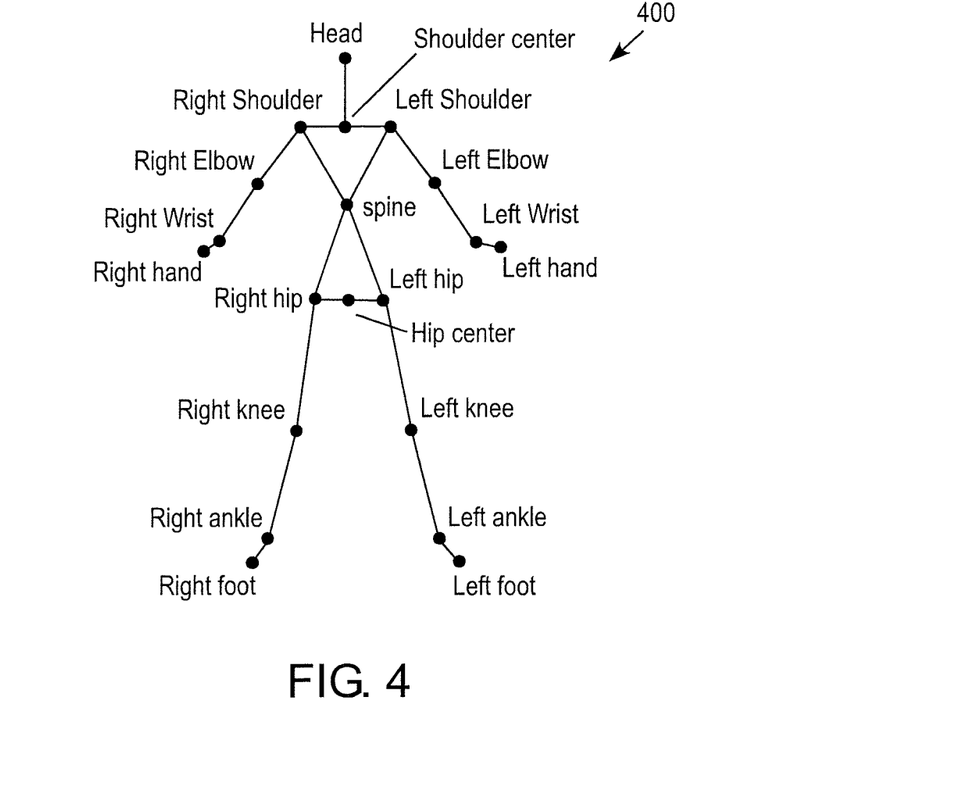
FIG. 4 is an illustration of skeletal joints and corresponding three-dimensional (3D) positions, which can be used for deriving features in accordance with an exemplary embodiment.

FIG. 4 is an illustration 400 of skeletal joints and corresponding three-dimensional (3D) positions, which can be used for deriving features in accordance with an exemplary embodiment. As shown in FIG. 4, preferably, the 3D positions of the 16 major joints in a human skeleton system can be detected using the depth camera and motion sensors. However, in accordance with an exemplary embodiment, not all or less than 16 joints are needed. For example, in accordance with an exemplary embodiment, only the joints of the right and left hip and above, for example, the upper torso and head can be used. In addition, the right and left hand, and the right and left foot, for example, may not be used for deriving the features for engagement index score detection since they are often very close to the wrist and ankle joints, and can be almost redundant.

Figure 5:
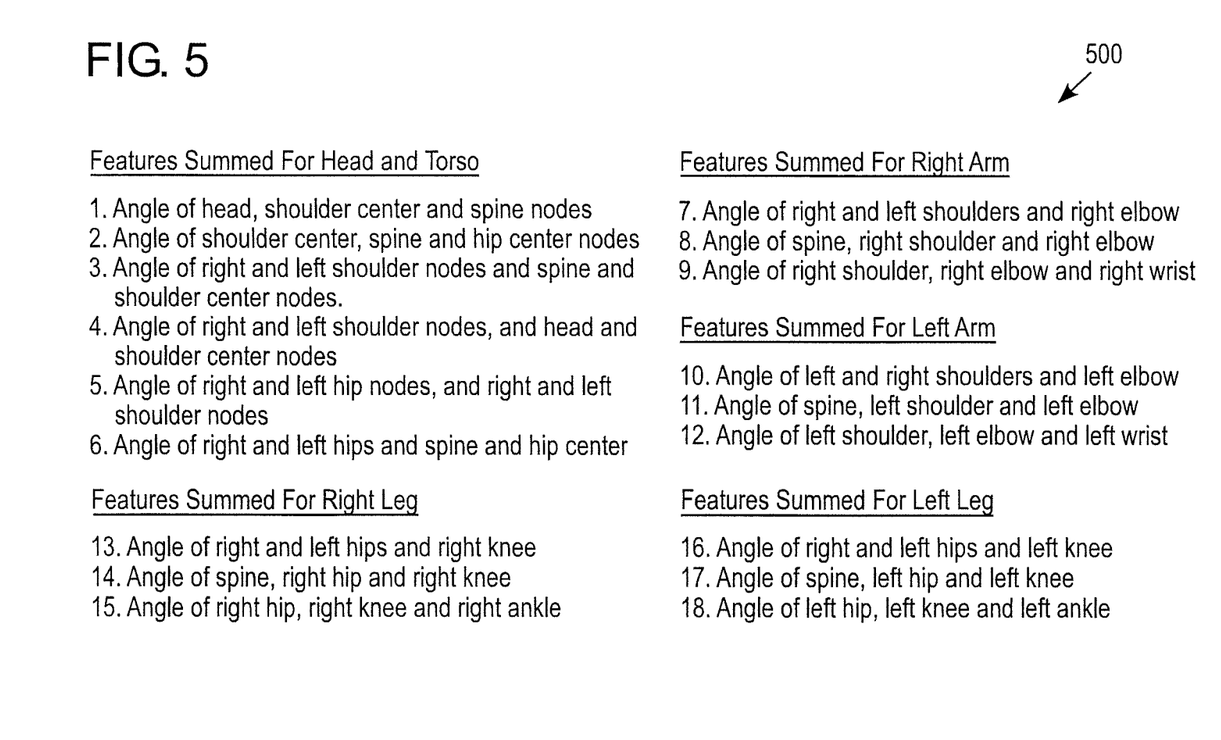
FIG. 5 is a table for calculating movement features and angles from the skeletal joints as shown in FIG. 4 in accordance with an exemplary embodiment.

In accordance with an exemplary embodiment, features can be derived from the calculated angles for each of the skeleton joints used in the calculation. For example, for a skeleton as shown in FIG. 4, 18 total angles (or movement features) can be calculated per skeleton. Each of the angles can correspond to approximate movement of the corresponding joint. The 18 angles 500 are shown in FIG. 5, and an include five (5) major categories, which can include features summed for the head and torso, features summed for the right arm, features summed for the left arm, features summed for the right leg, and features summed for the left leg.

In accordance with an exemplary embodiment, from each angle, at each frame, three measurements can be derived, which can include mean, standard deviation, and estimated-skewness. For example, in accordance with an exemplary embodiment, for the 18 angles, 54 angle features can be generated or derived.

In accordance with an exemplary embodiment, mean represents average angle of the joint, standard deviation measures the amount the angle varies over time, and estimated-skewness (or skewness) represents the measure of how much the angle deviates from the mean.

In accordance with an exemplary embodiment, the engagement index score can be calculated in an offline mode. Alternatively, in accordance with an exemplary embodiment, the engagement index score can be calculated online or in a real-time mode, such that feedback can be given in real-time. In addition, each of the features, mean, standard deviation, and skewness can be calculated in an online mode. In accordance with an exemplary embodiment, the calculations can be performed using a "sliding window" method, for example, wherein each of the calculations can be performed within a specified time window. For example, the mean, the standard deviation, and the estimated skewness can be calculated for a fixed duration, or time-window, for example, in a 15 seconds to 3 minute time window, for example, a 30 second to 2 minute time window.

In accordance with an exemplary embodiment, the equations to calculate mean, standard deviation and estimated-skewness in real-time are as follows:

$$V_k = \begin{cases} V_{k-1} \times \frac{k-2}{k-1} + \frac{(X_k - \mu_{k-1})^2}{k} & \text{, if } k > 1 \\ 0 & \text{, otherwise} \end{cases}$$

$$\sigma_k = \sqrt{V_k}$$

$$\mu_k = \frac{(k-1) \times \mu_{k-1} + X_k}{k}$$

$$\gamma_k = \frac{\mu_k - V_k}{\sqrt{V_k}}$$

where k is a continuous integer number; $V_k$, $\sigma_k$, $\mu_k$, $\gamma_k$ are variance, standard deviation, mean and skewness at time k, respectively; $X_k$ is the value at time k.

As set forth above, since the 18 angles can be grouped into 5 major categories, which can include head and torso, right arm, left arm, right leg, and left leg, the feature values, mean, standard deviation and skewness of angles for each of the five (5) major categories or region can be averaged for that body region, to reduce the redundancy of features as well as to minimize effects of occlusion. Thus, for example, each of the five (5) categories can include 3 features for every region, and thus in total 3 times 5 equals 15 features for every frame for each of the speakers 210 and/or one or more listeners 130, 132, 134, 136.

Figure 6:
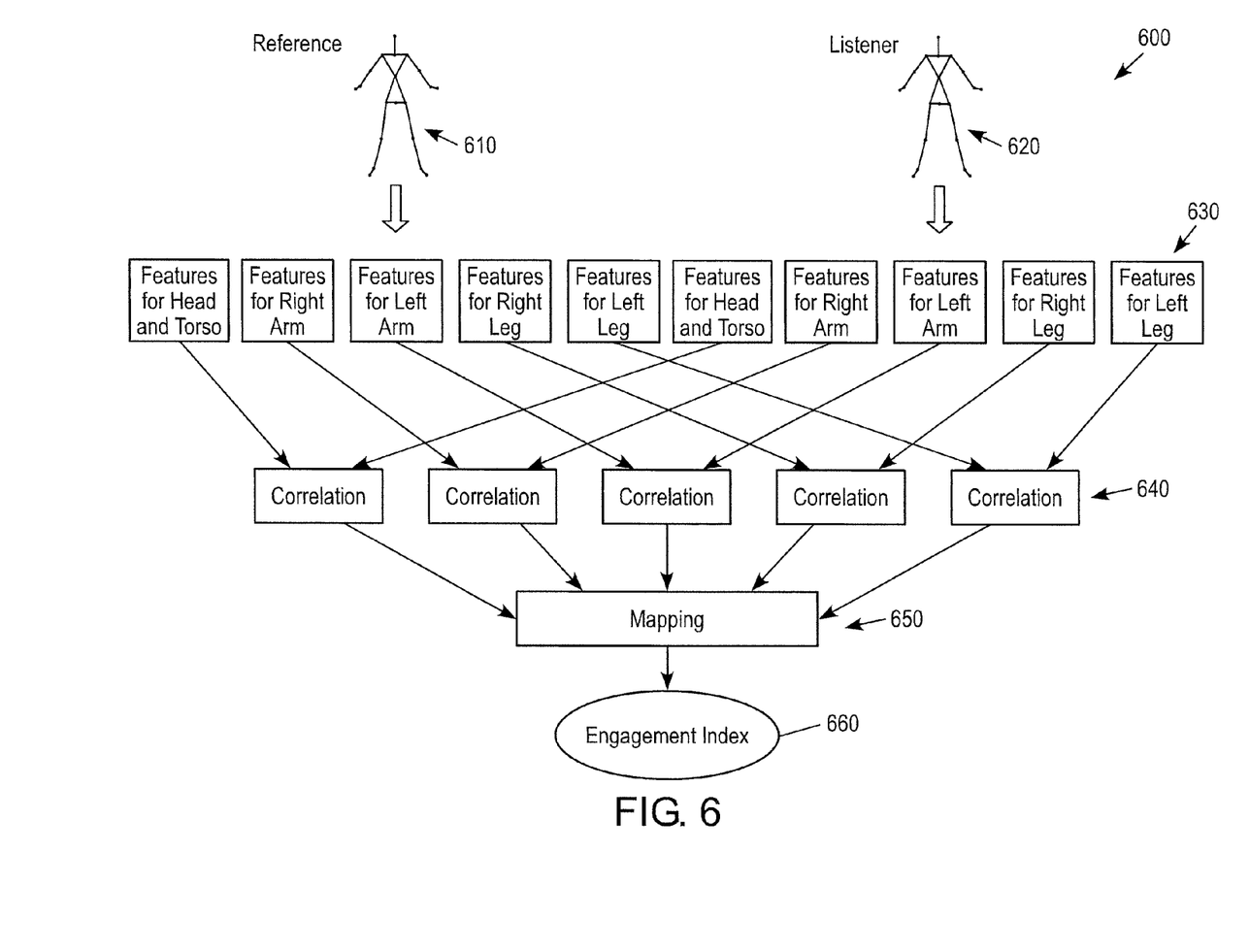
FIG. 6 is a diagram showing an engagement index measurement module in accordance with an exemplary embodiment.

FIG. 6 shows the engagement Index measurement module. The engagement index is quantified by synchrony score between, for example, speaker 110 and listener(s) 130, 132, 134, 136, which fundamentally is the correlation of the movement between them over a time window. Here the 18 angles can be roughly divided into 5 body regions and for each region, which can include the mean, standard deviation, and skewness features. By finding correlations for each body region's features between reference (either speaker or listener's attentive state) and listener, one can obtain 15 such synchrony scores (5 times 3), 3 for each region. The correlation between two variables can be defined as follows:

$$\rho_{X,Y} = \text{corr}(X, Y) = \frac{\text{cov}(X, Y)}{\sigma_X \sigma_Y} = \frac{E[(X - \mu_X)(Y - \mu_Y)]}{\sigma_X \sigma_Y},$$

where $\rho_{X,Y}$ is the correlation between listener and speaker, or the synchrony measure of a listener relative to the speaker; and X and Y are the feature vectors extracted from listener and the speaker, respectively.

In accordance with an exemplary embodiment, an engagement index score can be measured and/or obtained for each of the speakers 110 and/or one or more listeners 130, 132, 134, 136. In accordance with an exemplary embodiment, the engagement index score can be a correlation between the speaker 110 and the one or more listeners 130, 132, 134, 136, which can be based on the movement of the speaker 110 and/or one or more listeners 130, 132, 134, 136 over a time window, for example, 30 second to 90 seconds, for example, 50 seconds. In accordance with an exemplary embodiment, the time window can be about 1 second to about 10 minutes, and more preferably about 5 seconds to 2 minutes.

For example, in accordance with an exemplary embodiment, the engagement index score can be calculated based on the following understanding, wherein the speaker 110 is in a standing position and the one or more listeners 130, 132, 134, 136 are in a seating position. In the scenarios where the speaker 110 is standing and the listeners 130, 132, 134, 136 are seated, for example, on chairs. Generally, when a communication starts, the listeners 130, 132, 134, 136 are in an attentive position and their body movement displays their attentiveness subconsciously. However, once the communication starts, the body positions and movements of the listeners 130, 132, 134, 136 will change, which can be indicative a change in attentiveness.

In accordance with an exemplary embodiment, as shown in FIG. 6, the measurement of engagement index 600 can be computed by comparing the reference 610 to the listener 620. For example, as set forth above, the 18 skeleton angles can be divided into 5 body regions (or categories) 630 and for each region (or category), a mean, standard deviation, and skewness features can be calculated. By finding correlations 640 for each body region's features between reference (either speaker or listener's attentive state) and listener, 15 such synchrony scores can be generated (5×3), three (3) for each region or category.

In accordance with an exemplary embodiment, the calculated synchrony scores 640 can be fed into a mapping (or classifier) 650, which can predict, if this interaction is a high or low success interaction. For example, in accordance with an exemplary, the output 660 of the mapping (or classifier) can an engagement index score for that particular listener, which can be classified as either "high" or "low".

Figure 7:
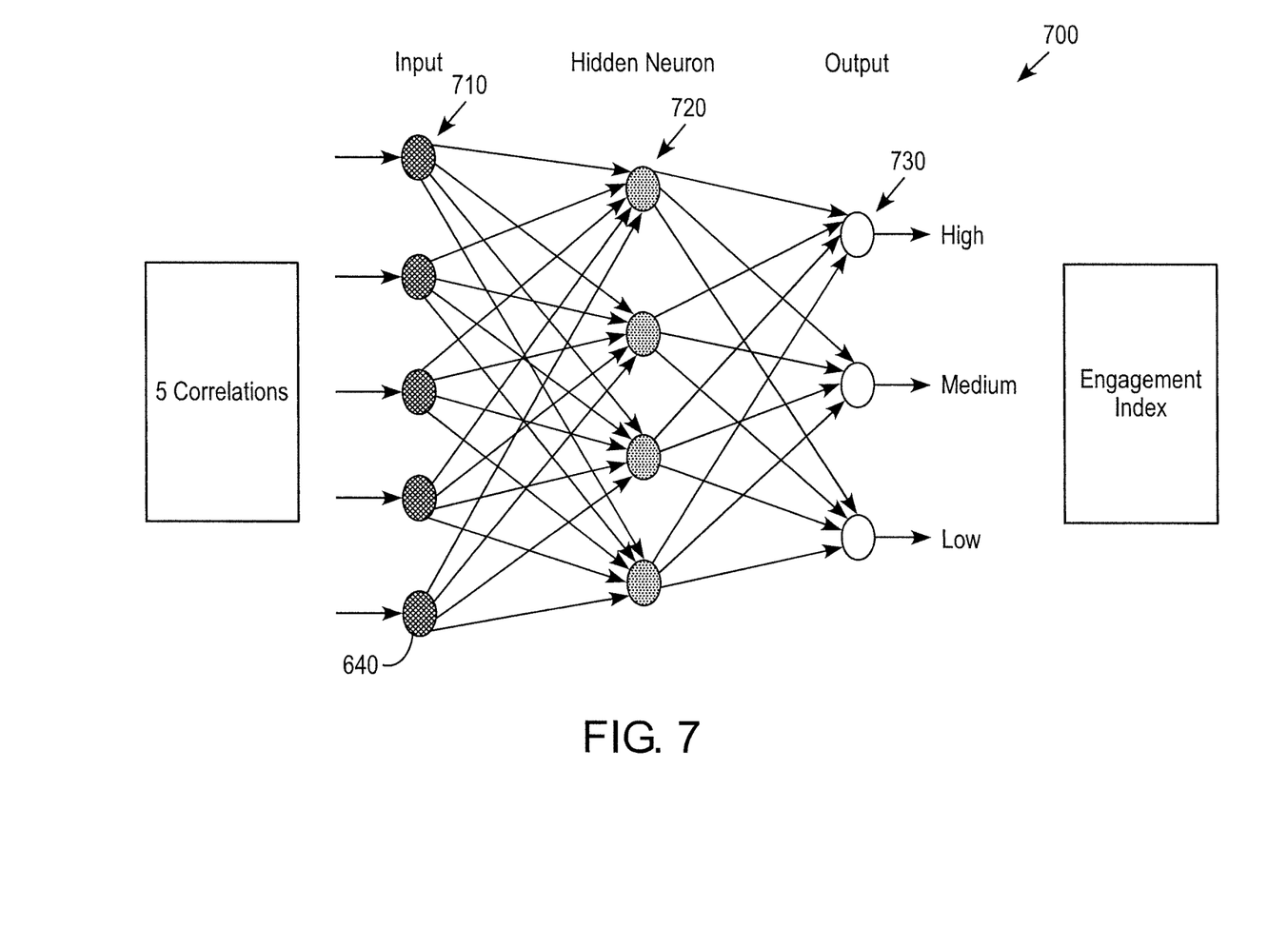
FIG. 7 is a diagram showing a multiple layer perception neural network for mapping correlations to an engagement index in accordance with an exemplary embodiment.

FIG. 7 is a diagram showing a multiple layer perception neural network 700 for mapping correlations to an engagement index in accordance with an exemplary embodiment. In accordance with an exemplary embodiment, the mapping function can be a multiple layers perception neural network as shown in FIG. 7, where the input neurons 710 can be 5 correlation values 640 from FIG. 6 and the output neurons 730 can be three levels of index, for example, high (1), medium (0) and low (−1).

In accordance with an exemplary embodiment, other visual information (or hidden neurons 720) such as facial expression such as "confusion", "frustration" can give the understanding of how engaging the conversation is between the participants. For example, a quantitative measure of facial expression can enhance the engagement index. By adding an additional input neuron 720 in FIG. 7, this information can be mapped with the above corrections as shown FIG. 6 to the engagement index.

In addition, other body gestures such as shaking head and nodding head are also considered as the indications of engagement between the speaker and listeners. If the listener(s) are following the speaker in a conversation, subconsciously human tend to shake or nod the head to express disagreement/agreement. The count of shaking/nodding the head, observed for a sufficiently longer duration, suggests the engagement degree.

In accordance with an exemplary embodiment, the method and system as disclosed herein can be used in connection with facial gesture recognition. For example, the method to detect the facial expression or gestures of the listener(s) can give the understanding of how engaging the conversation is between the speaker and listeners. In accordance with an exemplary embodiment, the quantitative measurement of expressions like "confusion," "frustration," and positive or negative emotions, for example, happy and/or sad can be used to measure engagement index score of the conversation. In accordance with an exemplary embodiment, this index can be passed to the engagement index module 250 and the feedback system 270 for providing feedback to the participants.

In accordance with an exemplary embodiment, for example, the correlation between emotional expression changes between the speaker 110, and the one or more listeners 130, 132, 134, 136 can provide synchrony between the speaker 110 and the listener 130, 132, 134, 136 and a correlation matrix can be the engagement index passed to the feedback system. In addition, the feedback system 270 can pass the feedback to the participants accordingly. For example, in accordance with an exemplary embodiment, the engagement Index can be equal to the correlation of the speaker's emotional states and listener's emotional states.

In accordance with an exemplary embodiment, if the listener(s) 130, 132, 134, 136 are following the speaker in a conversation then subconsciously human tend to shake or nod the head in disagreement/agreement and thus it can be a measure that the conversation engagement exists between the speaker 110 and the one or more listeners 130, 132, 134, 136.

For example, the count of shaking/nodding the head, observed for a sufficiently longer duration, can suggest the engagement score which is passed to the feedback system 270 which in turn provides feedback to the participants 110, 130, 132, 134, 136.

In addition, when the conference is more like a group discussion, the engagement index can be used for measuring the state of discussion. In this case, a method and system is disclosed, which can measure the synchrony of an individual to all other individuals and then take an average of synchrony index of all individuals, for example, $$\overline{S} = \frac{\sum_{i \in N} \left\{ \max_{j \in N \wedge j \neq i} (\rho_{i,j}) \right\}}{N}$$

where i and j denote the index of two individuals in the group; N is the total number of participants in the group meeting; $\overline{S}$ is the average of synchrony index for an entire group, namely, group synchrony index.

In accordance with an exemplary embodiment, the feedback system 270 can provide different kinds of feedback to the participants, which can include audio and/or visual alert, for example via a computer 150 (FIG. 1), and/or a vibration alert by means of wearable device (not shown). In addition, depending on the situation, the system can decide the feedback should go to which participant. For example, if there are multiple listener(s) and around, for example, 35-40% of the listeners have a bad engagement score, the speaker can be notified by feedback for poor communication engagement. Thus, the speaker can change the topic or approach to make the communication more engaging.

In addition, if there are multiple listener(s) and less than, for example, 35% have a bad engagement score, the feedback should be given to the listeners with bad scores so that they can be more attentive, which can help improve the communication between the participants. For example, in case of single speaker and a single listener system, the feedback can be sent to both the participants so that they can put the efforts together to improve the communication engagement.

In accordance with an exemplary embodiment, the system can monitor the engagement index score for a sufficiently long duration, for example, 5 to 15 minutes, before sending the feedback to the participants as very frequent feedback can be annoying and instead of improving the communication, it might contribute to degradation of the communication.

In accordance with an exemplary embodiment, for example, while deriving the engagement index, current frame's timestamp for both listener and speaker can be taken into account. In addition, network delays can be taken into account when measuring the synchrony.

In accordance with an exemplary embodiment, a non-transitory computer readable medium is disclosed containing a computer program storing computer readable code for improving communication productivity, the program being executable by a computer to cause the computer to perform a process comprising: capturing at least one three-dimensional (3D) stream of data on two or more subjects; extracting a time-series of skeletal data from the at least one 3D stream of data on the two or more subjects; and determining an engagement index between the two or more subjects by comparing the time-series of skeletal data on each of the two or more subjects over a time window.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for improving communication productivity, comprising:
    capturing at least one three-dimensional (3D) stream of data on each of two or more subjects, wherein at least one of the two or more subjects is classified as a speaker and one or more of the two or more subjects is classified as a listener;
    extracting a time-series of skeletal data from the at least one 3D stream of data on each of the two or more subjects;
    generating a synchrony score for the two or more subjects, wherein the synchrony score is calculated by comparing the time-series of skeletal data of each of the two or more subjects to one another for a defined period of time; and
    using the synchrony score to generate an engagement index between the two or more subjects.

2. The method of claim 1, comprising:
    providing feedback in real time to at least one of the two or more subjects if the engagement index between the two or more subjects is classified as a low interaction.

3. The method of claim 1, comprising:
    classifying the at least one of the two or more subjects as the speaker and the one or more of the two or more subjects as the listener based on video and audio correlation of the stream of data.

4. The method of claim 1, comprising:
    generating the synchrony score for each of the two or more subjects at a same time of a conversation.

5. The method of claim 1, comprising:
    generating a synchrony score for the one or more of the two or more subjects classified as the listener by comparing skeletal data at a starting point of a conversation and at one or more subsequent points of the conversation.

6. The method of claim 1, wherein the the synchrony score between the two or more subjects is generated by comparing one or more of the following features:
    head and torso;
    right arm;
    left arm;
    right leg; and
    left leg.

7. The method of claim 1, further comprising:
    detecting facial expressions or gestures for each of the two or more subjects;
    comparing the facial expressions or gestures; and
    combining the comparison of the facial expressions or gestures and the comparison of the series of skeletal data on each of the two or more subjects to generate the engagement index score for each of the two or more subjects.

8. The method of claim 1, wherein the synchrony score is calculated using the following:
    a mean, which represents average angle of a joint;
    a standard deviation, which measures an amount an angle varies over time; and
    an estimated-skewness, which represents a measure of how much the angle deviates from the mean.

9. A non-transitory computer readable medium containing a computer program storing computer readable code for improving communication productivity, the program being executable by a computer to cause the computer to perform a process comprising:
    capturing at least one three-dimensional (3D) stream of data on each of two or more subjects, wherein at least one of the two or more subjects is classified as a speaker and one or more of the two or more subjects is classified as a listener;

extracting a time-series of skeletal data from the at least one 3D stream of data on each of the two or more subjects;

generating a synchrony score for the two or more subjects, wherein the synchrony score is calculated by comparing the skeletal data of each of the two or more subjects to one another for a defined period of time; and using the synchrony score to generate an engagement index between the two or more subjects.

10. The computer readable storage medium of claim 9, comprising providing feedback in real time to at least one of the two or more subjects if the engagement index between the two or more subjects is classified as a low interaction.

11. The computer readable storage medium of claim 9, comprising:

classifying at least one of the one of the two or more subjects as the speaker and the one or more of the two or more subjects as the listener based on video and audio correlation of the 3D stream of data; and generating the synchrony score for each of the two or more subjects at a same time of a conversation.

12. The computer readable storage medium of claim 9, comprising:

generating a synchrony score for the one or more of the two or more subjects classified as the listener by comparing skeletal data at a starting point of a conversation and at one or more subsequent points of the conversation.

13. The computer readable storage medium of claim 9, wherein the synchrony score between the two or more subjects is generated by comparing one or more of the following features:

head and torso;
right arm;
left arm;
right leg; and
left leg.

14. The computer readable storage medium of claim 9, further comprising:

detecting facial expressions or gestures for each of the two or more subjects;
comparing the facial expressions or gestures; and
combining the comparison of the facial expressions or gestures and the comparison of the series of skeletal data on each of the two or more subjects to generate the engagement index score for each of the two or more subjects.

15. A system for improving communication productivity, comprising:

a video camera for capturing at least one three-dimensional (3D) stream of data on each of two or more subjects; and a processor configured to:
extract a time-series of skeletal data from the at least one 3D stream of data on each of the two or more subjects,
classify at least one of the two or more subjects as a speaker and one or more of the two or more subjects as a listener;
generate a synchrony score for the two or more subjects, wherein the synchrony score is calculated by comparing the skeletal data of each of the two or more subjects to one another for a defined period of time; and
use the synchrony score to generate an engagement index between the two or more subjects.

16. The system of claim 15, comprising:

a speaker, a display, or a vibration alert wearable, which is configured to provide feedback in real time to at least one of the two or more subjects if the engagement index between the two or more subjects is classified as a low interaction.

17. The system of claim 15, wherein the processor is configured to:

classify the at least one of the one of the two or more subjects as the speaker and the one or more of the two or more subjects as the listener based on video and audio correlation of the 3D stream of data.

18. The system of claim 15, wherein the processor is configured to:

generate the synchrony score for each of the two or more subjects at a same time of a conversation.

19. The system of claim 15, wherein the processor is configured to:

generate a synchrony score for the one or more of the two or more subjects classified as the listener by comparing skeletal data at a starting point of a conversation and at one or more subsequent points of the conversation.

20. The system of claim 15, wherein the synchrony score between the two or more subjects is generated by comparing one or more of the following features:

head and torso;
right arm;
left arm;
right leg; and
left leg.

* * * * *